United States Patent Office 3,790,640
Patented Feb. 5, 1974

---

3,790,640
GLYCOLIC ETHER SUITABLE AS MEDICAMENT
Teikichi Kurosaki, Munehiko Odaka, and Satoshi Hanaoka, Osaka, Japan, assignors to Nippon Zoki Pharmaceutical Co., Ltd., Osaka, Japan
No Drawing. Filed Jan. 3, 1972, Ser. No. 215,181
Claims priority, application Japan, Dec. 31, 1970, 46/124,202
Int. Cl. C07c *43/00, 43/04*
U.S. Cl. 260—615 R          1 Claim

ABSTRACT OF THE DISCLOSURE

The novel compound, 2-(2-hydroxybutoxy)-3-hydroxybutane, and synthetic methods for producing the same. This compound is useful as a cholagogue and displays a remarkably low toxicity.

---

This invention relates to a novel compound having the constitutional formula

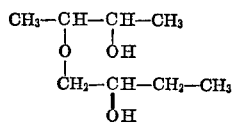

and to processes for producing said compound by synthesis. More particularly, it relates to the compound 2-(2-hydroxybutoxy)-3-hydroxybutane which is highly active as a cholagogue and has a low toxicity.

The compound of the invention has not been described in the literature either as to its properties or to synthetic methods for producing the same. After much research by the present inventors for useful compounds as medicaments, particularly in the field of cholagogues, it has been discovered that the novel compound described herein meets the requirements of an excellent activity as a cholagogue with a remarkably low toxicity.

Accordingly, one of the objects of the present invention is to provide a novel compound which is useful as a cholagogue.

Another object of the present invention is to provide a compound of the above-described formula which exhibits an excellent activity as a cholagogue and has a remarkably low toxicity.

A further object of the invention is to provide methods for producing said compounds by synthesis which may be carried out readily and efficaciously.

These and other objects and advantages of the present invention will become apparent to those skilled in the art from a consideration of the following specification and claims.

In accordance with the present invention, it has been found that the compound, 2-(2-hydroxybutoxy)-3-hydroxybutane having the above-mentioned formula (hereinafter called H.B.E.), exhibits a more excellent activity as a cholagogue and has a remarkably lower toxicity than the well known medicament, N-(p-hydroxyphenyl)-salicylamide (Oxaphenamide), represented by the following formula

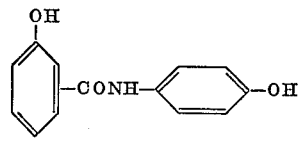

which has been used for a considerable time as a cholagogue.

A great advantage of H.B.E. is its extremely lower toxicity. Thus, the $LD_{50}$ with mice for P.H.P.S. is 1.34 grams and that for H.B.E. is 7.10 grams, respectively, per kilogram of body-weight in oral administration, while in intravenous administration the $LD_{50}$ for P.H.P.S. is 0.55 gram, and that for H.B.E. is 1.45 grams. The $LD_{50}$ with rats for P.H.P.S. per kilogram of body-weight is 2.38 grams and that for H.B.E. is 6.40 grams in oral administration, while the $LD_{50}$ for P.H.P.S. is 0.26 gram and that for H.B.E. is 1.04 grams in intravenous administration.

Given below is the pharmacological activity of H.B.E. evaluated in relation to the bile secretion value in the rats. These tests were conducted as follows:

Ten rats fasted for fifteen hours before the experiment and anesthetized with ethylurethane were fixed in the supine posture. Each rat was laparotomized and a cannula was connected with the common bile duct. The volume of the bile secretion was measured twice every twenty minutes (their mean value as the basic index is indicated in the table as 100) from thirty minutes after the beginning of operation onward. Then, after 0.4 ml. of a solution containing 100 mg. of H.B.E. or P.H.P.S., respectively, or a saline solution as a control was administered to the upper part of the duodenum, the volume of the bile secretion was determined at an interval of every twenty minutes over five hours. The results are shown in the table and the figures in the table indicate the volume of the bile secretion with the index of 100 before administration of the above solution in each group.

TABLE

| T. S. | Number of test animals | Mean value | \multicolumn{15}{c}{Transitional values after administration, time (minutes)—} | Total |
|---|---|---|---|---|---|---|---|---|---|---|---|---|---|---|---|---|---|
| | | | 20 | 40 | 60 | 80 | 100 | 120 | 140 | 160 | 180 | 200 | 220 | 240 | 260 | 280 | 300 | |
| H.B.E. | 10 | 100 | 148 | 163 | 159 | 156 | 148 | 141 | 133 | 120 | 115 | 107 | 107 | 100 | 100 | 92 | 89 | 1,870 |
| P.H.P.S. | 10 | 100 | 138 | 138 | 132 | 120 | 104 | 104 | 96 | 104 | 88 | 76 | 100 | 88 | 88 | 88 | 88 | 1,460 |
| Saline | 10 | 100 | 110 | 104 | 100 | 100 | 100 | 97 | 93 | 97 | 93 | 86 | 86 | 86 | 85 | 86 | 86 | 1,409 |

To sum up the above-mentioned observations, H.B.E. has a distinctly excellent pharmacological activity and an extremely lower toxicity as compared with those of P.H.P.S., which is well known as a cholagogue.

The compound 2-(2-hydroxybutoxy)-3-hydroxybutane can be synthesized by varous methods. The preferred method for the production of H.B.E. comprises the reaction of 1,2-butylene oxide with 2,3-butanediol in the presence of a basic catalyst. The details of such a synthetic procedure are shown in Examples 1 and 2. These examples, however, are merely for the purpose of illustration and should not be considered as limitative of the scope of this invention.

The catalysts which can be used in the reaction for synthesizing H.B.EE. are basic catalysts such as sodium alcholate, potassium alcoholate, sodium hydroxide, potassium hydroxide, etc. Sodium alcoholate or potassium hydroxide is preferred. Although the reaction of this invention can be conducted at room temperature (20–25° C.), its velocity is accelerated and the claimed compound H.B.E. can be obtained with good yield by heating the reaction mixture up to suitable temperatures in relation to the kind and quantity of the catalyst employed.

EXAMPLE 1

36 grams of 1,2-butylene oxide is added to a solution containing 1.5 grams of metallic sodium dissolved in 135 grams of 2,3-butanediol at a temperature of 70–75° C. with stirring. After continuing the reaction for ten hours at said temperature under stirring, the reaction solution is stirred at 100–110° C. for three hours. Then, 7.5 grams of tartaric acid is added to the solution to neutralize the mixture. After filtering off the insoluble salts in the solution, the filtrate is distilled under reduced pressure to obtain 55.4 grams of pure H.B.E. The yield is 68.3% (B.P. 125–216° C./13.5 mm. Hg). The product substance is a colorless, viscous liquid, and is very easily soluble in water, ether or alcohol, but only slightly soluble in petroleum ether. The results of elementary analysis, assuming the molecule of ($C_8H_{18}O_3$), are:

calculated value: C, 59.23%; H, 11.18%
observed value: C, 58.95%; H, 10.97%

This compound was identified by its infrared spectrum in dilute carbon tetrachloride as the following:

free secondary hydroxy groups: $\nu$S O—H 2628$^{cm.-1}$
methyl and methylene groups: $\nu$C—H 2970–2850$^{cm.-1}$
methyl groups: $\nu$SC—H 1375$^{cm.-1}$
aliphatic ether groups: $\nu$as C—O—C 1090$^{cm.-1}$

EXAMPLE 2

72 grams of 1,2-butylene oxide is added to a solution of 180 grams of 2,3-butyleneglycol and 3 grams of potassium hydroxide. This mixture is then stirred at 100° C. for five hours. The resulting reaction mixture is neutralized with concentrated sulfuric acid. After filtration, 117.7 grams of pure H.B.E. is obtained by fractional distillation. The yield is 72.5% (B.P. 87–89° C./2 mm. Hg). The results of analysis assuming ($C_8H_{18}O_3$) are:

calculated value: C, 59.23%; H, 11.18%
observed value: C, 59.15%; H, 11.08%

The physical and chemical properties of this compound and the values obtained by the infrared spectrum in dilute carbon tetrachloride are the same as those described in Example 1.

The invention being thus described, it will be obvious that the same may be varied in many ways. Such variations are not to be regarded as a departure from the spirit and scope of the invention, and all such modifications are intended to be included within the scope of the following claim.

We claim:

1. A compound having the formula,

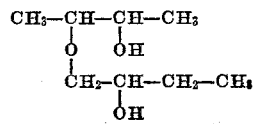

References Cited

UNITED STATES PATENTS

| | | | |
|---|---|---|---|
| 2,684,387 | 7/1954 | Young | 260—615 R |
| 3,240,819 | 3/1966 | Gaertner et al. | 260—615 R |
| 2,327,053 | 8/1943 | Marple et al. | 260—615 R |
| 2,788,372 | 4/1957 | Brandner | 260—615 R |

FOREIGN PATENTS

| | | | |
|---|---|---|---|
| 1,267,084 | 6/1961 | France | 260—615 R |
| 722,746 | 1/1955 | Great Britain | 260—615 B |

OTHER REFERENCES

Felisati et al., Chem. Abs. 62 (1965) 7005h.
Felisati et al., Chem. Abs. 59 (1963) 12063e.
Cretcher et al. J.A.C.S. 46 (1924) 1503–4.

HOWARD T. MARS, Primary Examiner

U.S. Cl. X.R.

260—999; 424—342